United States Patent [19]

Bantle

[11] 4,132,430
[45] Jan. 2, 1979

[54] WHEEL SUSPENSION ARRANGEMENT FOR MOTOR VEHICLES

[75] Inventor: Manfred Bantle, Vaihingen, Germany

[73] Assignee: Firma Dr. Ing. h.c.F. Porsche AG, Germany

[21] Appl. No.: 786,757

[22] Filed: Apr. 12, 1977

[30] Foreign Application Priority Data

Jun. 22, 1976 [DE] Fed. Rep. of Germany ....... 2627847

[51] Int. Cl.² .............................................. B60G 7/02
[52] U.S. Cl. ................................. 280/673; 267/63 R
[58] Field of Search ............... 280/673, 675, 663, 661, 280/660, 688, 690, 691, 696, 716; 403/224, 225, 228; 267/20 A, 63 R

[56] References Cited

U.S. PATENT DOCUMENTS

| | | | |
|---|---|---|---|
| 2,372,744 | 4/1975 | Sherman | 280/673 X |
| 2,958,526 | 11/1960 | Ulderup | 267/63 R |
| 2,996,311 | 8/1961 | Thiry | 280/695 |
| 3,147,964 | 9/1964 | Wolf | 403/224 X |
| 3,202,410 | 8/1965 | Schell | 267/63 R |
| 3,237,962 | 3/1966 | Kraus | 280/673 |
| 3,311,364 | 3/1967 | Castelet | 280/716 |
| 3,464,716 | 9/1969 | Butler | 280/716 |
| 3,551,990 | 1/1971 | Wehner | 280/673 X |
| 3,608,927 | 9/1971 | Grosseau | 280/716 |

Primary Examiner—Kenneth H. Betts
Attorney, Agent, or Firm—Craig & Antonelli

[57] ABSTRACT

A wheel suspension arrangement is provided for the front nondriven wheel of a motor vehicle. This arrangement includes a lower guide rod linkage connecting the wheel carrier to the vehicle frame, as well as an upper guide rod linkage also guidingly connecting the wheel carrier with the vehicle frame. The upper guide rod linkage is elastically supported at respective front and rear elastic guide rod bearings carried by a longitudinally extending axle fixed to the vehicle frame. These front and gear guide rod bearings include elastic material which is either cut away internally to form kidney-shaped recesses or is reinforced such that the bearings exhibit different elasticities depending upon the relative direction of movement of the upper guide rod linkage and the frame in the vehicle horizontal transverse direction. Axial stops are provided at the axle supporting the guide rod bearings so as to permit a greater axial movability of the upper guide rod linkage in a direction opposite to the direction of vehicle driving than in the vehicle driving direction.

10 Claims, 3 Drawing Figures

U.S. Patent    Jan. 2, 1979    4,132,430
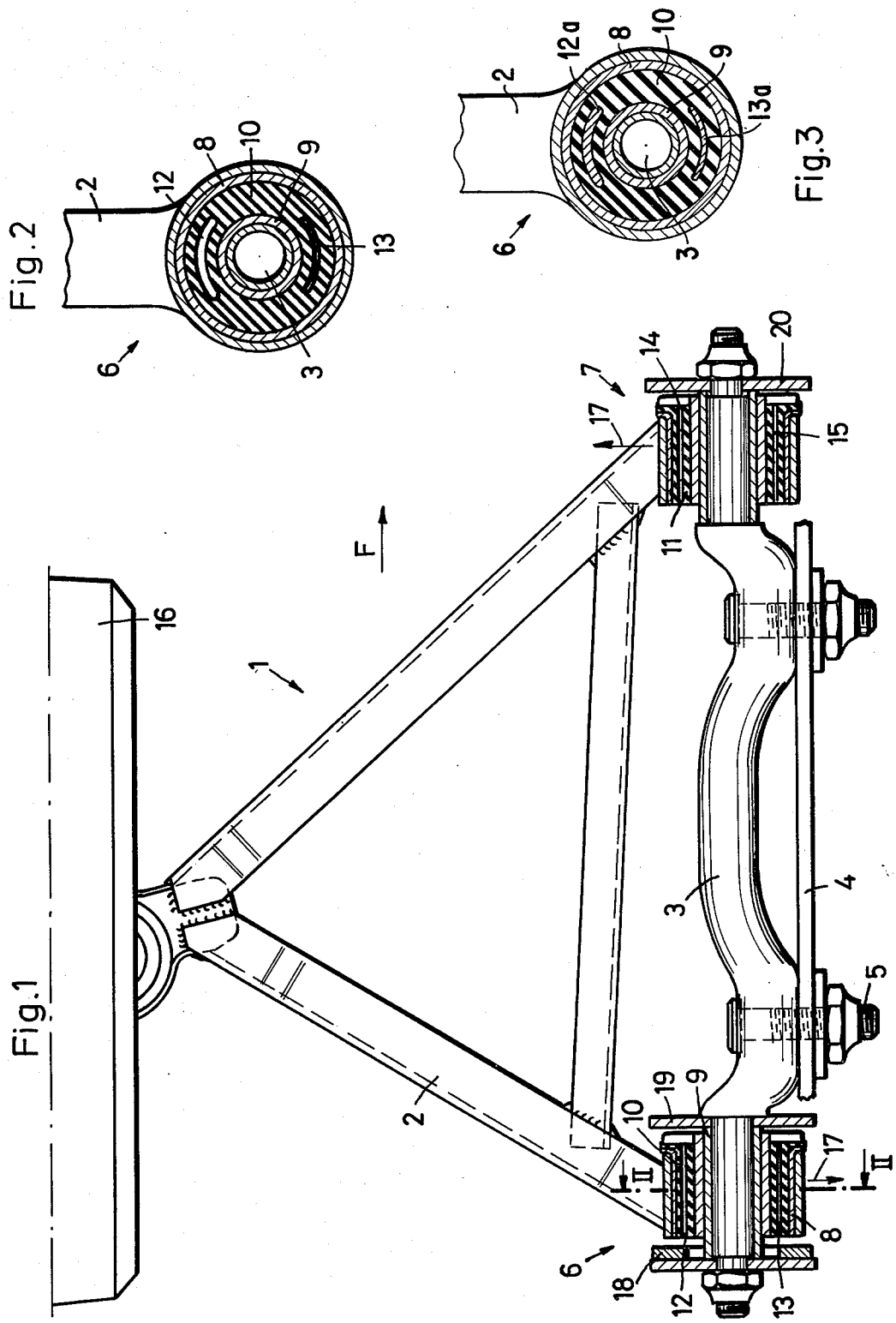

WHEEL SUSPENSION ARRANGEMENT FOR MOTOR VEHICLES

BACKGROUND AND SUMMARY OF THE INVENTION

The present invention relates to wheel suspension arrangements for motor vehicles of the type having a double transverse guide rod linkage arrangement pivotably connected at the vehicle frame. Such double guide rod linkages include respective upper and lower guide rod linkages attached to the wheel carrier. Preferred embodiments of the invention relate to specific constructions of an upper guide rod linkage which is connected to the vehicle frame for pivotal movement by way of a guide rod axle extending approximately in the vehicle driving direction.

For the support of wheel suspensions at a vehicle frame, rubber-metal elements are known (see German Published Application DT-OS No. 2,017,205) which comprise rubber muffs placed in metal sleeves. So that a large motive force and isolation of noise is obtained, these guide rods are constructed soft, a construction which is disadvantageous with regards to the driving stability of the motor vehicle.

In the case of a non-driven front axle with double transverse guide rod linkages and axially and radially yielding guide rod bearings connecting same to a vehicle frame, the motive force with free-rolling wheel and a longitudinal push between the roadway and the wheel is transmitted to the guide rod linkages at the level of the wheel axis of rotation. Both guide rod linkages shift and rotate in opposition to the direction of the motive force (push) whereby, in a disadvantageous manner, changes in the front tracking characteristics ("German-Vorspur"— camber condition with wheel top portions inclined toward vehicle center) of the vehicle may occur.

With a brake force engaging at the wheel, the force engagement point is located at the level of the roadway, and the lower guide rod linkage is rotated or turned towards the rear at the side of the wheel and the upper guide rod linkage is turned towards the front at the side of the wheel. By this construction, a reduction of the camber-and-pivot inclination occurs causing a decrease in the vehicle stability in the direction of driving. During braking while driving in a curve, the vehicle may be guided into the curve by the reversal of the steering moment.

In the case of side forces, the maximum force occurs at the curve-outer wheel directed towards the rear whereby the transverse guide rod linkages twist in such a manner that a reduction of the camber-and-pivot angle as well as the camber angle occurs with a decrease in the lateral guide force.

The present invention, at least in part, contemplates providing wheel suspension constructions which avoid the above-discussed disadvantages and improve an elastic support for a front wheel suspension of the type mentioned above with double transverse guide rod linkages in such a way, that, in spite of the guide rod suspensions being elastically yielding longitudinally for an increase in the rolling comfort of the vehicle, a maximum stability in the direction of driving is obtained.

According to preferred contemplated embodiments of the invention, the front and rear guide rod bearings of the upper transverse guide rod linkage are provided with variable elasticities in the horizontal vehicle transverse direction. Preferred embodiments also provide that the guide rod support bearings are constructed axially yieldingly at least in the direction opposite the direction of driving.

By the above-noted construction of the present invention, longitudinal impact forces, as well as braking and side forces, are advantageously absorbed and accommodated for by appropriate dimensioning of the elastic guide rod bearings for the upper guide rod linkage.

According to a further refinement of the invention, it is provided that the support of the upper transverse guide rod linkage is constructed with the rear guide rod bearing exhibiting a greater elasticity for movement of the rear portion of the guide rod linkage towards the vehicle middle and with the front guide rod bearing exhibiting a greater elasticity for movement of the front portion of the guide rod linkage towards the wheel. Also, in preferred embodiments of the invention, the support of the upper transverse guide rod linkage at the rear guide rod bearing is less elastic for relative movement of the rear portion of the guide rod linkage towards the wheel and at the front guide rod bearing is less elastic for movement of the front portion of the guide rod linkage towards the vehicle centerline or middle. Also, preferred embodiments of the invention are constructed with the elastic guide rod bearings exhibiting less elastic support for relative movement of said upper guide rod linkage in the direction of driving than in opposition to the direction of driving. By these means, an axial and/or radial rotation and axial movement of the upper transverse guide rod linkage in the guide rod bearings is optimally obtainable corresponding to the loading the supported wheel is subjected to during use.

These and further objects, features and advantages of the present invention will become more obvious from the following description when taken in connection with the accompanying drawings which show, for purposes of illustration only a single embodiment in accordance with the present invention.

BRIEF DECRIPTION OF THE DRAWINGS

FIG. 1 is a schematic part-sectional top view of an upper transverse guide rod linkage connecting a wheel and wheel carrier with a vehicle frame, constructed in accordance with a preferred embodiment of the invention; and FIG. 2 is a cross-sectional view along line II—II of FIG. 1.

FIG. 3 is a view similar to FIG. 2, but illustrating a modified arrangement.

DETAILED DESCRIPTION OF THE DRAWINGS

Wheel suspension arrangement 1 consists of a double transverse guide rod linkage with the illustrated upper guide rod linkage 2 and a lower guide rod linkage not shown. It will be understood by those skilled in the art that the lower guide rod linkage will extend below upper guide rod linkage 2 and also guidingly support the wheel 16 and wheel carrier thereof at the vehicle frame. The guide rod linkages 2 are supported swingably on axles 3 at the vehicle frame 4. The axles 3 extend approximately parallel to the center line of the motor vehicle and are attached to the vehicle frame 4 with two bolts 5.

The upper guide rod linkage 2 is supported in guide rod bearings 6 and 7 arranged at a longitudinal spacing from one another. Guide rod linkage 2 is constructed essentially rigid from its attachment to the wheel carrier for wheel 16 to its respective elastic supports at the frame 4 via axle 3 and bearings 6 and 7. Each of the elastic guide rod bearings 6 and 7 include a muff 10, 11 of elastic material pressed into between metal sleeves 8 and 9. The guide rod axle 3 is held in the inner metal sleeve 9. The outer metal sleeve 8 is accommodated and supported directly by a metal sleeve of the guide rod linkage 2. In other non-illustrated preferred embodiments, the outer metal sleeve 8 is dispensed with and the elastic bearing material muff 10, 11 is pressed directly into the sleeve 9 of the guide rod linkage 2.

The two elastic guide rod bearings 6 and 7 are provided with dissimilar radial elasticity in the horizontal vehicle transverse direction. For this purpose, the muffs 10 and 11 are preferably provided with kidney-shaped recesses 12, 13 (bearing 6) 14, 15 (bearing 7) which have a dissimilarly large cross-sectional surface in the vehicle transverse direction (see FIG. 2 for a showing of the rear bearing construction 6 — it being understood that front bearing 7 is constructed similarly, but with the kidney-shaped recesses reversed as to position in the transverse direction). Also, for obtaining the same effect according to other embodiments, the muffs 10 and 11 are made of disimilar yieldingness or are provided at one side with inserted stiffening metal sheets. The use of inserts to vary the radial elasticities of elastic mounts is described in U.S. Pat. No. 2,958,526 and FIG. 3 illustrates their use in the present invention at 12a, 13a.

The front guide rod bearing 7 (seen in the direction of driving F) is provided in the direction towards the wheel 16 with a large radial elasticity while the rear guide rod bearing 6 is also provided in the direction towards the vehicle center with a large radial elasticity. This is accomplished in the illustrated embodiment by the large kidney-shaped recesses 12, 15, in the muffs 10, 11. On the other hand, the rear guide rod bearing 6, in the direction towards the wheel 16, and the front guide rod bearing 7, in the direction towards the vehicle center, are provided with smaller elasticity. This is accomplished by the kidney-shaped recesses 13 and 14 being smaller in cross-section than are the respective recesses 12 and 15.

A longitudinal impact occurring at the wheel 16 between roadway and wheel results in an evasive rotating movement (depicted by arrows 17 in FIG. 1) of the upper guide rod linkage 2 with respect to the frame 4 in opposition to the direction of driving F towards the rear. The above-noted differing radial elastic support at the respective bearings 6 and 7 contributes to a noie isolation between roadway and body during such relative movement 17.

Through the small radial elasticities of the front guide rod bearing 7 towards the vehicle center (caused by radial recess 14 corresponding to recess 13 of FIG. 2 in shape and size but positioned at the opposite side of the axle 3) and of the rear guide rod bearing 6 towards wheel 16 (caused by recess 13 being smaller than recess 12), the camber-and-pivot angle and camber angle changes, unfavorably influencing the driving behavior, are advantageously avoided during braking and driving through curves.

The guide rod bearings 6 and 7 are provided, aside from their radial elasticity, with an axial yieldingness. The provided greater yieldingness in an axial direction opposite the direction of driving F makes a longitudinal movement of the guide rod linkage 2 possible when a longitudinal impact occurs at the free rolling wheel 16. On the other hand, a small yieldingness of the guide rod bearings 6 and 7 is provided in the direction of driving F. By this means, a camber-and pivot change and a camber change, unfavorably affecting the driving behavior, is avoided during braking and driving through a curve.

In order to limit the axial movement of the transverse guide rod linkage 1 in opposition, respectively in the direction of driving F, the guide rod axle 3 is provided at its free ends with stops 18, 19 and 20. The guide rod bearings 6 and 7 support themselves against these stops at the face side during a wheel loading process.

As shown in FIG. 1, an axial space (distance) is provided during driving between the rear guide rod bearing 6 and the corresponding stop 18. In contrast thereto, the front guide rod bearing 7 is almost in contact with the front stop 20 and the front of guide rod bearing 6 is almost in contact with stop 19.

During the braking process, the upper transverse guide rod linkage 2 has a tendency to twist horizontally in the direction of driving F. This is prevented by the less elastic constructed muffs (recesses 13, 14) of bearings 6 and 7 in this direction, as well as through the stops 19 and 20.

With a longitudinal impact, on the other hand, the upper transverse guide rod linkage 2 moves oppositely to the direction of driving up to stop 18 and at the same time the guide rod linkage 2 twists horizontally in the twisting direction depicted by arrows 17. This guide rod linkage movement is supported by the large radial elasticity of the muffs (recesses 12, 15) in this direction.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A double control arm wheel suspension arrangement for a motor vehicle comprising an upper control arm, said upper control arm being mounted by front and rear elastic guide rod bearings to a guide rod axle running approximately parallel to the longitudinal centerline of the vehicle on the vehicle frame, said front elastic guide rod bearing being constructed so as to be more elastic in a horizontal transverse direction away from the longitudinal centerline of the vehicle than toward said centerline and said rear elastic guide rod bearing being constructed so as to be more elastic toward the vehicle longitudinal centerline than away therefrom, such that resilient rearward movement of the upper control arm occurs under action of longitudinal impacts, while undesirable changes which adversely influence driving behavior are prevented during braking and traveling through curves.

2. An arrangement according to claim 1, wherein said front and rear elastic guide rod bearings are constructed to be less elastic in the forward direction of travel than in the opposite rearward direction of travel for facilitating rearward displacement of the control arm under action of longitudinal impact forces.

3. An arrangement according to claim 1, wherein said upper guide control arm is substantially rigid from its connection at a wheel carrier to the respective front and rear elastic guide rod bearings.

4. An arrangement according to claim 3, wherein said wheel carrier and upper guide rod linkage are configured for supporting and guiding a non-driven front wheel of a vehicle.

5. An arrangement according to claim 1, wherein each of said front and rear guide rod bearings include elastic material interposed between a first part rigidly connected to and movable with said upper guide rod linkage and a second part rigidly connected to and movable with said vehicle frame,
   and wherein inserts are arranged in said elastic material to form said differing elasticities.

6. An arrangement according to claim 1, wherein elastic stop means are provided at said vehicle frame adjacent said guide rod bearings for limiting the axial longitudinal movement of said upper guide control arm.

7. An arrangement according to claim 6, wherein said elastic top means are disposed so as to permit a greater longitudinal movement of said upper guide control arm in a direction opposite the vehicle driving direction than in the driving direction.

8. Wheel suspension arrangement for motor vehicles comprising:
   an upper guide rod linkage having an outer transverse end portion thereof supportingly attachable to and movable together with a vehicle wheel carrier,
   a front elastic guide rod bearing for interconnecting a front inner transverse portion of said upper linkage with a relatively fixed vehicle frame at a position spaced transversely of said wheel carrier,
   a rear elastic guide rod bearing for interconnecting a rear inner transverse portion of said upper linkage with said vehicle frame at a position spaced transversely of said wheel carrier,
   said front and rear elastic guide rod bearings being spaced from one another in the vehicle longitudinal direction and including means for supporting said upper linkage for pivotal movement about an axis extending through said bearing substantially in the vehicle longitudinal direction,
   said front and rear elastic guide rod bearing exhibiting respective different elasticities in the vehicle transverse direction thereby providing different force transmission characteristics between said wheel carrier and said vehicle frame in dependence on the direction of rotational movement of said wheel carrier with respect to the vehicle frame in a horizontal plane, wherein said rear guide rod bearing exhibits a smaller elasticity for absorbing relative movement of the rear portion of the guide rod linkage towards the wheel being supported than for absorbing relative movement of the rear portion of the guide rod linkage towards the vehicle center line, wherein said front guide rod bearing exhibits a smaller elasticity for absorbing relative movement of the front portion of the guide rod linkage towards the vehicle center line than for absorbing relative movement of the front portion of the guide rod linkage towards the wheel being supported, wherein each of said front and rear guide rod bearings include elastic material interposed between a first part rigidly connected to and movable with said upper guide rod linkage and a second part rigidly connected to and movable with said vehicle frame, wherein each of said front and rear guide rod bearings are provided with recesses being configured to form said differing elasticities, and wherein said recesses are constructed kidney-shaped and are provided in the radial direction of said guide rod bearings with dissimilar cross-sections.

9. An arrangement according to claim 8, wherein elastic stop means are provided at said vehicle frame adjacent said guide rod bearings for limiting the axial longitudinal movement of said upper guide rod linkage.

10. An arrangement according to claim 9, wherein said elastic stop means are disposed so as to permit a greater longitudinal movement of said upper guide rod linkage in a direction opposite the vehicle driving direction than in the driving direction.

* * * * *